May 7, 1929.  H. H. BOYCE  1,712,289

ILLUMINATING DEVICE

Filed June 24, 1922   2 Sheets-Sheet 1

Inventor
Harrison H. Boyce,
By his Attorneys

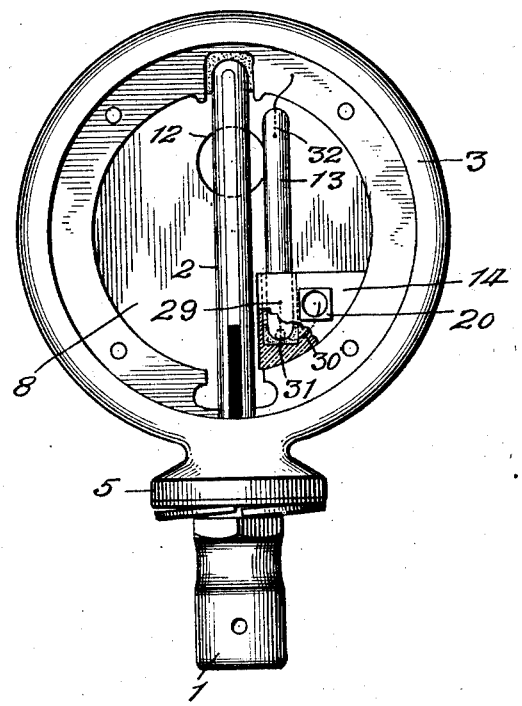
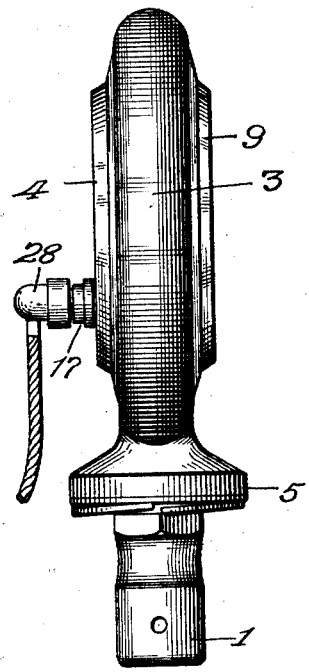
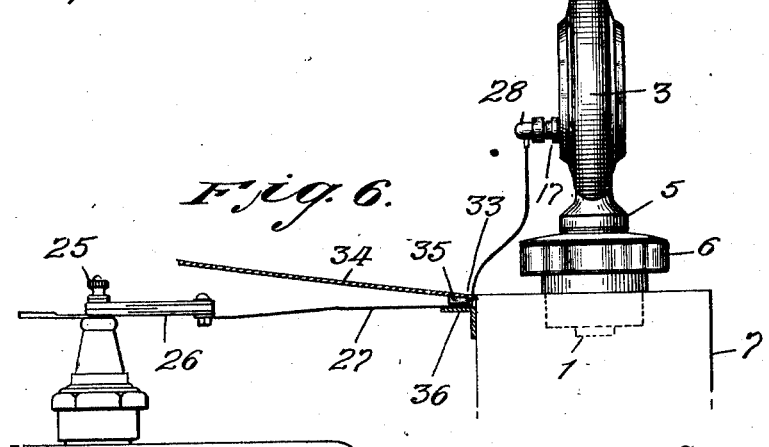

Patented May 7, 1929.

1,712,289

UNITED STATES PATENT OFFICE.

HARRISON H. BOYCE, OF JERICHO, NEW YORK.

ILLUMINATING DEVICE.

Application filed June 24, 1922. Serial No. 570,619.

This invention relates to illuminating devices for motor heat indicators.

It is particularly concerned with the illumination of instruments for indicating the temperatures of the internal combustion engines of motor vehicles and is in the nature of an improvement on the invention illustrated and described in my prior application for patent on illuminating devices, filed April 12, 1922, Serial No. 551,956. The said patent application contemplates, briefly, to provide an indicating instrument with an illuminating device consisting of a tube containing a rarefied gas and electrically connected to the terminal of a spark plug. The character of the gas and the degree of rarefication are such that the gas is caused to glow when subjected to the spark plug potential.

The present application relates to an improved manner of incorporating the said tube with a certain well known form of motor temperature indicating instrument, the object being to locate the illuminating device in direct proximity to the indicating element of the instrument, preferably within the casing thereof, so as to render the indications of the motor heat indicator very distinctly visible without interfering with the driver's vision of the dark road ahead.

Another object of the invention consists in providing an attachment for existing temperature indicating instruments, which attachment may be readily applied to such instrument by merely substituting the same for an existing part of the instrument. In particular, the invention contemplates the mounting of the illuminating device on a part suitable for use as a cover plate of the instrument, so that the user will be enabled to mount the attachment on the instrument by removing the old cover plate and substituting the new one with its attachments.

A good understanding of the above and various other features and objects of the invention may now be had from the following description thereof, having particular reference to the accompanying drawings, in which, Figure 1 is a front elevation of one form of instrument embodying my invention;

Figure 4 is a view of the instrument with the face crystal and face plate removed to expose the interior parts of the instrument;

Figure 5 is a view showing the instrument in side elevation; and

Figure 6 is a diagrammatic view showing the instrument in operative position on the radiator cap of a motor vehicle.

Similar characters of reference designate similar parts in each of the several views.

Figure 1:
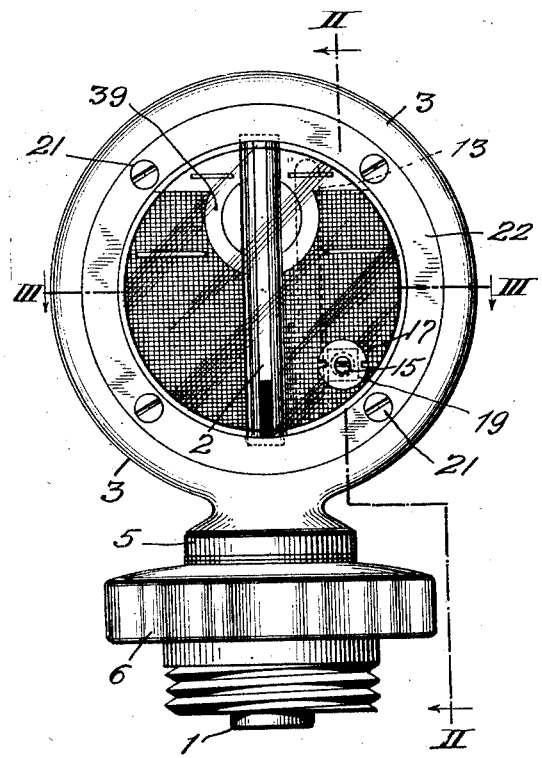
Figure 2:
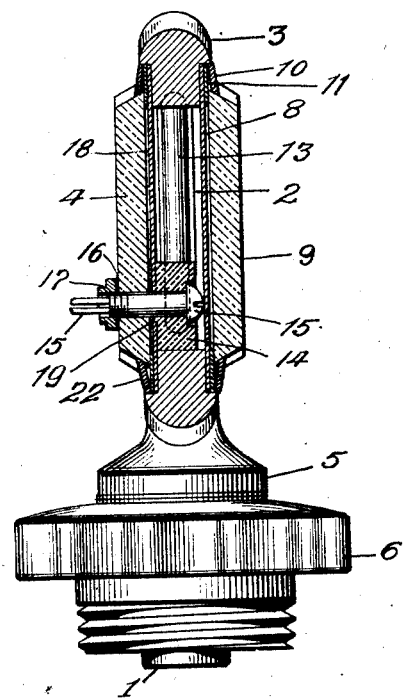
Figures 2 and 3 are sections of Figure 1, taken on lines II—II and III—III, respectively, looking in the direction of the arrows.
Figure 3:
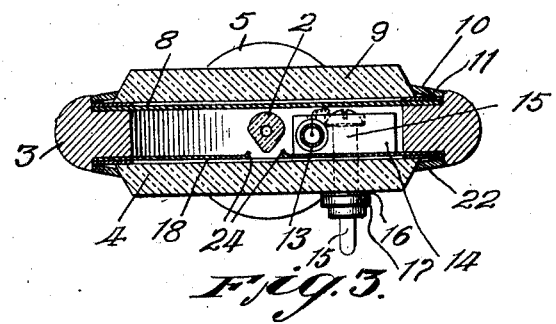

The motor heat indicator with which the illuminating device of the present invention is operatively associated, is of a type well known in the art and therefore is not described in detail. For the purpose of the present invention, it is sufficient to note that it consists of a thermometer comprising a bulb 1 and a stem 2, the stem being enclosed in a ring-shaped casing 3 provided with a face crystal 4 by virtue of which the indications of the thermometer are rendered visible to the driver or other occupant of the vehicle. The casing 3 is provided with a base 5 whereby the same may be mounted upon a radiator cap 6 in such manner that the bulb 1 will extend into the top of the motor vehicle radiator 7, (see Figure 6).

Behind the stem 2 of the thermometer is placed a dial plate 8 provided with graduations with which the column of thermometric fluid in stem 2 registers to indicate the temperature conditions under which the engine is operating. The back of the dial plate is provided with suitable ornamentation or marking and is covered by means of a back crystal 9 secured to the casing 3 by a bezel 10 retained in position by suitable securing means such as screws (not shown), as suitable washer 11 being interposed between the crystal and plate 8 to provide an air-tight seal. An opening 12 is located in that part of the dial plate 8 adjacent the upper end of the thermometric tube for the purpose of admitting light through the rear wall, so as to render the thermometric column particularly distinctly visible when the engine temperature approaches the danger point.

The parts of the instrument thus far described are comprised in a well-known commercial form of temperature indicating instrument, to which the illuminating device, which will now be described, may be furnished as an attachment.

The illuminating device illustrated in the present form or embodiment of the invention consists of a tube 13 containing a rarefied gas, such as neon, which is caused to glow by the application of an electric potential, such as is furnished to the spark plugs of the engine.

This tube is mounted in a block 14 of insulating material, this block being substantially triangular in form, the one side of the triangle, however, being curved to fit the interior wall of the casing 3. The lower end of the tube is mounted within the block by suitable sealing material. The block 14 is secured in position by means of a screw 15 which etxends through the block and through the crystal 4, a fibre washer 16 and nut 17 being provided on the face of the crystal to secure the block firmly in position.

A face dial plate 18, bearing markings similar to the original dial plate 8, is provided between block 14 and crystal 4, this plate having a square opening 19 within which is received a correspondingly shaped boss 20 (Figure 4) of the block, the thickness of the boss being equal to that of the dial plate. The dial plate is fixed in position on casing 3 by means of the bezel-retaining screws 21 passed through corresponding openings in the dial plate. The boss on the block 14 serves thus to hold the block, and therefore the tube, fixed in position. The face of the dial plate is provided with a vertical slot having inturned flanges 24, the purpose of this slot being to expose to view the thermometric tube which is directly behind the slot. The light from tube 13 illuminates the entire length of the visible portion of stem 2. The light from the lighting unit or light source 13 is absorbed by the glass of the thermometer stem and is transmitted all through the glass so that it appears to be a light source when the adjacent objects are dark. While this provides a soft light, it renders the indications of the tube clearly visible at night.

It will be observed that an important feature of the invention consists in locating the illuminating tube within the casing, preferably to the side of the thermometric tube, so that the direct rays of the tube cannot pass out of the casing, this being true because of the flanges 24 provided in the dial plate 18 which acts as an opaque light intercepting shield plate to cut off all stray light and to render the true light source invisible. The driver's vision of the dark road ahead is thus not interfered with.

The manner in which electric potential is furnished to the tube is illustrated diagrammatically in Figure 6, in which view the instrument is shown as being mounted on the cap 6 of the radiator 7 of an internal combustion engine. The connection is made from the terminal 25 of a spark plug of the engine (this plug being furnished with potential by the usual ignition circuit of the engine) and extends through a condenser 26 or other suitable impedance and through a wire 27 to a detachable connector 28 which cooperates with the end of screw 15, this portion of the screw being split, as usual in detachable connectors of this general character. The screw is in electrical connection with one electrode 29 of the tube, this electrode consisting of a wire 30 which extends through a small opening 31 in block 14, the end of this wire being wound around the head of screw 15. It will be noted that the bushing 20 serves to insulate the screw from the dial plate 18.

The other electrode, 32, of the tube extends a short distance out of the tube 13 and makes frictional contact with the casing 3, which casing is grounded on the engine frame. Owing to the intermittent operation of the spark plug, the glow of the tube will be intermittent in character and produce a rather pleasing effect.

As indicated in Figure 6, the wire 27 is led preferably through a small notch 33 in the end of the engine hood 34 and passed between the strip 35 of cushioning material and the flange 36 on which the hood is supported. By this means a chafing off of the insulation of the wire is prevented.

As hereinbefore mentioned, the present illuminating device may be furnished as an attachment to existing temperature indicating instruments. The attachment as placed on the market, would preferably consist of the face crystal 4, the face dial plate 18 and the illuminating device 13 assembled into a unitary structure by the screw 15. This assembly may readily be attached to an existing temperature indicating instrument by removing the screws 21 and bezel 22, substituting for the old face crystal the assembly above-named and replacing the bezel and the screws to secure the parts in the relation indicated in the drawings. It will be observed that the original dial plate 8 is obscured by the new dial plate 18, and that these plates, together with the casing, form a casing open only at the slot directly in front of the stem of the thermometer, and at the window 12 in rear dial plate 8. The new dial plate is preferably nickeled at a circular area 39, which in contrast to the black background, preserves the distinctive effect produced by the window.

It may here be noted that the invention, in certain of its broader aspects, is not limited to the use of a glow tube as the illuminating means; other illuminating devices, such as incandescent lamps, responsive to electric potential of lower intensity may be employed, if desired.

It will thus be understood that although I have herein shown and described only one certain specific form of embodiment of the invention, many changes and modifications may be made therein within the scope of the following claims without departing from the spirit and scope of the invention, it being my intention to claim the same as broadly as the state of the prior art will permit.

What I claim is:

1. In an attachment for illuminating a temperature-indicating device, comprising a thermometer and a ring-shaped casing provided with a pair of crystals for enclosing the stem thereof, the combination of an elongated tube containing a rarefied gas adapted to glow when subjected to potential, and means secured to one of said crystals and cooperating with said ring-shaped casing for securing said tube in the casing, alongside the stem of said thermometer.

2. In an instrument for indicating the operating conditions of motor vehicles, the combination with a thermometer and a ring-shaped casing enclosing the stem of said thermometer, of an attachment including an elongated tube containing a rarefied gas subject to glow when subjected to potential, a block of insulating material for supporting said tube, a face crystal for the casing, a dial plate having graduations for cooperating with the column of thermometric fluid, said dial plate being provided with an opening for exposing to view the stem of the said thermometer, and means for securing said block, dial plate and crystal together.

3. In an instrument for indicating the operating conditions of motor vehicles, the combination with a thermometer and a ring shaped casing enclosing the stem of said thermometer, of an attachment including an elongated tube containing a rarefied gas subject to glow when subjected to potential, a block of insulating material for supporting said tube, a face crystal, a dial plate having graduations for cooperating with the column of thermometric fluid, means for securing said block, dial plate and crystal together, a detachable connecting device, said securing means comprising a member for cooperating with said detachable connecting device, and an electrical connection between said tube and said securing means.

4. The combination with a motor heat indicator having a thermometer with a stem, a casing for said thermometer having at front and back covers through one of which said stem may be observed and means for mounting said casing on a motor vehicle radiator, means for illuminating the stem of said thermometer, said illuminating means including an elongated illuminating tube adjacent said stem and at one side thereof, and means secured to one of said covers for securing said tube in such position.

5. The combination with a motor heat indicator having a thermometer with a stem, a casing for said thermometer having a cover through which said stem may be observed and means for mounting said casing on a motor vehicle radiator, means for illuminating the stem of said thermometer, said illuminating means including an elongated illuminating tube adjacent said stem and at one side thereof and means including the cover through which said stem is observed, for securing said tube in said casing and for preventing the passage from said casing of all rays of light extending directly from said tube.

6. An illuminating accessory for a motor heat indicator having an indicating stem, an open sided casing therefor closed by crystals said illuminating accessory including a crystal for replacing one of the casing closing crystals and an illuminating device secured to said illuminating accessory crystal and positioned within said casing when said crystal is in place upon said casing.

7. An illuminating accessory for a motor heat indicator having an indicating stem, an open sided casing therefor closed by crystals said illuminating accessory including a crystal for replacing one of the casing closing crystals and an illuminating device secured to said illuminating accessory crystal and positioned within said casing when said crystal is in place upon said casing, and means associated with said illuminating accessory for shielding the escape of direct rays from said illuminating device thru the front of the motor heat indicator.

In testimony whereof I have affixed my signature to this specification.

HARRISON H. BOYCE.